(12) United States Patent
Takahashi et al.

(10) Patent No.: US 8,251,230 B2
(45) Date of Patent: Aug. 28, 2012

(54) NOTCHED WIRE, NOTCHED WIRE ELEMENT AND FILTRATION APPARATUS

(75) Inventors: Hideto Y Takahashi, Yokohama (JP); Thanh Trung Phan, Yokohama (JP)

(73) Assignee: Kanagawa Kiki Kogyo Co., Ltd., Yokohama-shi (JP)

( * ) Notice: Subject to any disclaimer, the term of this patent is extended or adjusted under 35 U.S.C. 154(b) by 1764 days.

(21) Appl. No.: 11/231,802

(22) Filed: Sep. 22, 2005

(65) Prior Publication Data

US 2006/0266695 A1  Nov. 30, 2006

(30) Foreign Application Priority Data

May 30, 2005  (JP) ................................ 2005-156599
Jul. 6, 2005   (JP) ................................ 2005-197062

(51) Int. Cl.
*B01D 39/00* (2006.01)
(52) U.S. Cl. ............... 210/483; 210/497.01; 210/497.1; 210/499; 210/494.2
(58) Field of Classification Search ............ 210/483, 210/494.2, 497.01, 499, 497.1
See application file for complete search history.

(56) References Cited

U.S. PATENT DOCUMENTS

| 1,414,132 A | * | 4/1922 | Hurrell | 210/497.1 |
| 1,991,286 A | | 2/1935 | Mandahl | 210/169 |

FOREIGN PATENT DOCUMENTS

| DE | 1 003 184 | | 2/1957 |
| DE | 1003184 | * | 2/1957 |
| DE | 1003184 | * | 2/1958 |
| FR | 1369688 | | 7/1964 |
| GB | 687967 | | 2/1953 |
| WO | WO 93/07944 | | 4/1993 |

OTHER PUBLICATIONS

DE1003184—Patent, EPO bibliographic data, applicant's abstract from the IDS, and a machine translation of the patent.*
European Search Report dated Nov. 15, 2005, 5 pages.
Japanese-English/English-Japanese Dictionary of Fuel and Lubricant Technical Terms, p. 235, edited by The Marine Engineering Society in Japan, 3 pages including English translation.
Japanese Industrial Standards Committee: "JIS Filters for Marine Engine Inlet Lubricant Piping System and Fuel Piping System (JIS F7103)," 1992, 12 pages including English translation.
Japanese Marine Standards Association: "Explanations of JIS F7103 Filters for Marine Engine Inlet Lubricant Piping System and Fuel Piping System," pp. 2-228 to 2-234, 1994, 11 pages including English translation.

* cited by examiner

Primary Examiner — Walter D. Griffin
Assistant Examiner — Denise R Anderson
(74) Attorney, Agent, or Firm — Kratz, Quintos & Hanson, LLP

(57) ABSTRACT

A notched wire 4 that is disposed in layers in a filtration apparatus. First projection stripes 4d are formed on the top surface 4b of a base 4a at prescribed intervals in the longitudinal direction of the base 4a so as to extend in the width direction of the base 4a. Second projection stripes 4e are formed approximately at the centers of the first projection stripe 4d so as to extend between the first projection stripes 4d•4d. The second projection stripes 4e are projection stripes having an approximately semicircular cross section, for example. The second projection stripes 4e is smaller in height than the first projection stripes 4d, and the width of the second projection stripes 4e is shorter than the length of the first projection stripes 4d.

19 Claims, 6 Drawing Sheets

NOTCHED WIRE, NOTCHED WIRE ELEMENT AND FILTRATION APPARATUS

BACKGROUND OF THE INVENTION

1. Field of the Invention

The present invention relates to a notched wire, a notched wire element, and a filtration apparatus using a notched wire element.

2. Description of the Related Art

Conventionally, wire elements are used as filtering nets of filtration apparatus. Wedge-type wires and round-type wires are known as wires of wire elements, and wires called notch-type wires (hereinafter referred to as "notched wires") have come to attract much attention in recent years. A notched wire is such that one surface of a band plate made of a material such as stainless steel that is superior in strength and corrosion resistance is formed with projection stripes at prescribed intervals. A wire element (hereinafter referred to as "notched wire element") is constructed by winding a notched wire spirally around a filter cylinder, for example, in such a manner that its adjoining sections come in contact with each other in the vertical direction. A fluid to be filtered is caused to flow between the gaps formed by the recesses between the projection stripes of the notched wire element, whereby particles whose diameters are larger than the projection stripe height are removed (refer to the following documents (1)-(3)).

(1) Japanese-English/English-Japanese Dictionary of Fuel and Lubricant Technical Terms, p. 235, edited by The Marine Engineering Society in Japan, Seizando Shoten.

(2) "JIS Filters for Marine Engine Inlet Lubricant Piping System and Fuel Piping System (JIS F7103)," 1992, Japanese Industrial Standards Committee.

(3) JIS F Standards 2001, "Explanations of JIS F7103 Filters for Marine Engine Inlet Lubricant Piping System and Fuel Piping System," pp. 2-228 to 2-234, 1994, Japan Marine Standards Association.

Incidentally, in notched wire elements, to reduce the minimum size (particle diameter) of foreign substances to be captured in a fluid, it is necessary to decrease the height of the gaps by lowering the projection stripes. However, lowering the projection stripes decreases the open area ratio of the gaps and hence increases the flow resistance. To prevent such increase in flow resistance, it is necessary to increase the total open area ratio by decreasing the thickness of the band plate that is formed with the projection stripes. However, decreasing the thickness of the band plate lowers the strength of the notched wire and hence lowers the durability. A notched wire and a notched wire element are desired that are sufficiently strong and can reduce the minimum particle diameter of foreign substances to be captured while preventing increase in flow resistance.

SUMMARY OF THE INVENTION

The present invention has been made in view of the above problems in the art, and an object of the invention is therefore to provide a notched wire and a notched wire element that are sufficiently strong and can capture foreign substances having smaller particle diameters while preventing increase in the flow resistance of a fluid or the like, as well as a filtration apparatus using such a notched wire element.

The invention provides a notched wire disposed in layers in a filtration apparatus, a notched wire element comprising a filter frame of a filtration apparatus and a notched wire that is wound around the filter frame spirally in layers, and a filtration apparatus comprising a main body and a notched wire element disposed in the main body and comprising a filter frame and a notched wire that is wound around the filter frame spirally in layers. The notched wire comprises first projection stripes formed on one surface of a band plate at prescribed intervals in the longitudinal direction of the band plate so as to extend in a direction that is approximately perpendicular to the longitudinal direction of the band plate or has a prescribed inclination angle with respect to the longitudinal direction of the band plate; and second projection stripes extending between the first projection stripes, the height of the second projection stripes being smaller than that of the first projection stripes and the width of the second projection stripes being shorter than the length of the first projection stripes in the width direction of the band plate.

As for the notched wire, it is preferable that each of the second projection stripes have a convex surface or a slant surface between a peak and an outer end in the width direction thereof. It is even preferable that the second projection stripes be projection stripes having a generally semicircular cross section, a generally trapezoidal cross section, or a generally triangular cross section. The height of each of the second projection stripes extending between the first projection stripes may be constant in the longitudinal direction or vary (increase or decrease) gradually in the longitudinal direction. Each of the second projection stripes may be formed at a proper position in the width direction of the band plate, and it is preferable that each of the second projection stripes be formed approximately at the center of the width of the band plate. It is preferable that the second projection stripes be formed so as to cross, at about 90°, flow directions of a fluid or a powder that flows from the outside into the inside of the notched wire element. However, the second projection stripes may be formed so as to cross the flow directions at a prescribed angle other than about 90°.

The invention also provides a notched wire disposed in layers in a filtration apparatus, a notched wire element comprising a filter frame of a filtration apparatus and a notched wire that is wound around the filter frame spirally in layers, and a filtration apparatus comprising a main body and a notched wire element disposed in the main body and comprising a filter frame and a notched wire that is wound around the filter frame spirally in layers. The notched wire comprises first projection stripes formed on one surface of a band plate at prescribed intervals in the longitudinal direction of the band plate so as to extend in a direction that is approximately perpendicular to the longitudinal direction of the band plate or has a prescribed inclination angle with respect to the longitudinal direction of the band plate; and second projection stripes extending between the first projection stripes in the longitudinal direction of the band plate, the height of the second projection stripes being smaller than that of the first projection stripes, each of the second projection stripes having a convex surface or a slant surface between a peak and an outer end in the width direction thereof.

The filtration apparatus may be such that as a fluid or a powder flows through the notched filter element, it is filtered in two stages by first gaps S1 having the same height as the height of the first projection stripes and second gaps S2 having a height that is the height of the first projection stripes minus the height of the second projection stripes, the first and second gaps S1, S2 being formed between layered sections of the notched wire.

According to the invention, the second projection stripes that are smaller in height than the first projection stripes extend between the first projection stripes in the longitudinal direction of the band plate and particles are captured by the gaps formed between the first projection stripes and the gaps formed between the peaks of the second projection stripes and the bottom surface of the upper-layer section of the band plate. Therefore, particles having smaller diameters can be captured than in a case that only the first projection stripes are provided. Further, the second projection stripes extending between the first projection stripes has a reinforcement function and hence can increase the strength of the notched wire. As a result, the band plate itself of the notched wire can be made thinner.

Forming the second projection stripes in such a manner that their width is shorter than the length of the first projection stripes in the width direction of the band plate makes it possible to suppress increase of the wall friction in the gaps and to thereby suppress increase of the flow resistance of a fluid or the like.

Each of the second projection stripe is formed with the convex surface or the slant surface between the peak and the outer end in the width direction and, preferably, the cross section, taken in the width direction, of the second projection stripes is made generally semicircular, generally trapezoidal, or generally triangular. This suppresses occurrence of turbulence and thereby prevents increase in flow resistance, whereby a smooth flow can be secured.

Forming each of the second projection stripes approximately at the center in the width of the band plate makes it possible to reduce the maximum compressive stress and the maximum tensile stress that occur in the band plate in, for example, winding the notched wire around the filter frame. The strength and the durability of the notched wire can thus be increased.

Further, the two-stage filtering is performed by the first gaps S1 formed between the layered sections of the band plate and having the same height as the height of the first projection stripes and the second gaps S2 whose height is equal to the difference between the heights of the first projection stripes and second projection stripes. This enables efficient and reliable filtering.

DESCRIPTION OF THE PREFERRED EMBODIMENTS

An embodiment of the present invention will be hereinafter described with reference to the drawings.

Figure 1:
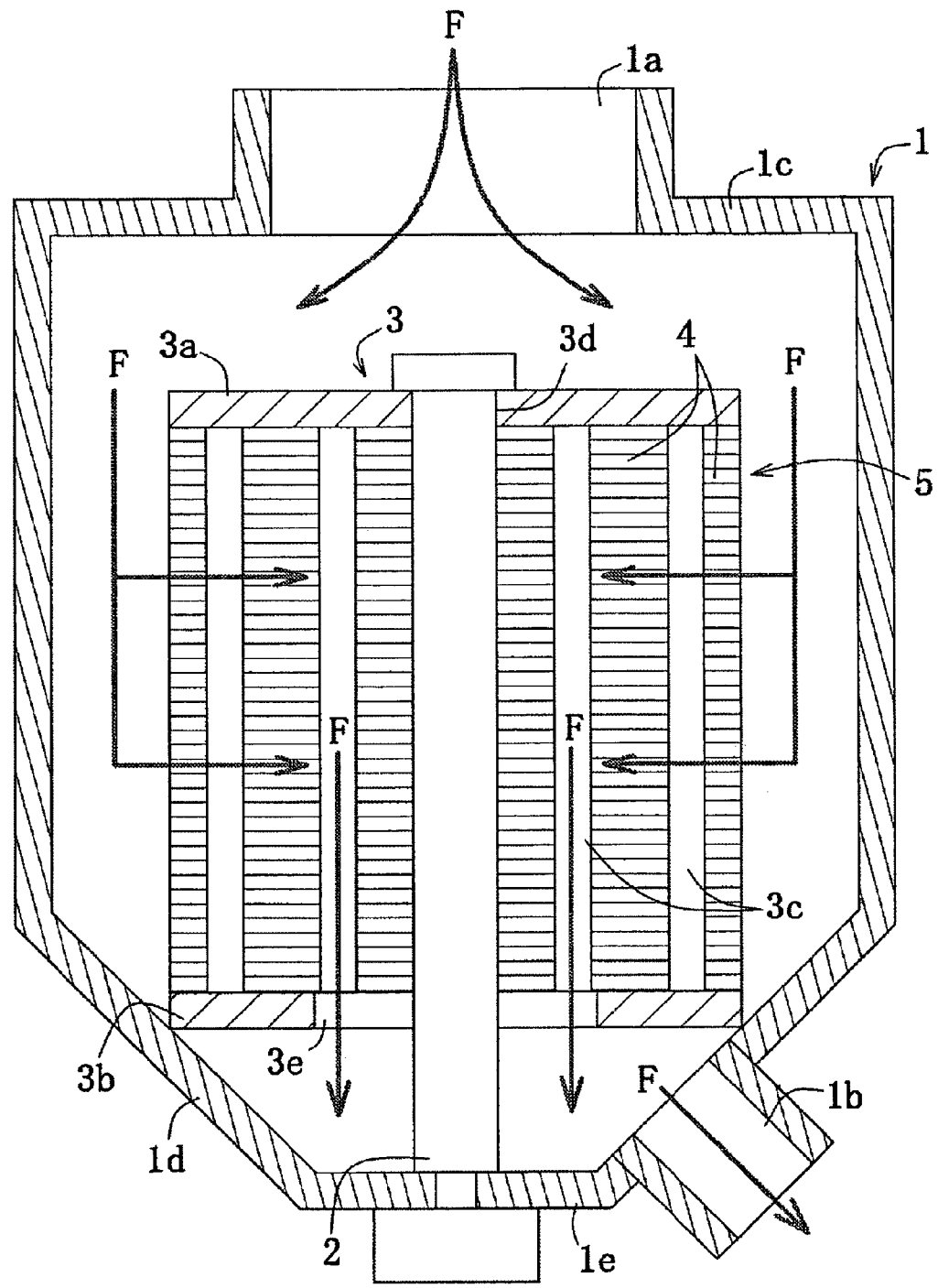
FIG. 1 is a vertical sectional view showing the entire configuration of a filtration apparatus according to an embodiment of the present invention.

As shown in FIG. 1, a main body 1 of a filtration apparatus according to the embodiment has a generally cylindrical shape whose bottom portion is shaped like a flat-top cone. Its top wall 1c is formed with an inlet 1a through which a fluid to be filtered flows into the main body 1 and a curved wall 1d of its bottom portion is formed with an outlet 1b through which a filtered fluid is discharged. The bottom end of a rod-shaped fixing member 2 penetrates through and is fixed to a bottom wall 1e of the main body 1, and the fixing member 2 is erected vertically in the main body 1.

A filter frame 3 is disposed in the main body 1 in such a manner that its center axis coincides with the center axis of the fixing member 2 and the main body 1. The filter frame 3 (filter cylinder) is configured in the following manner. A generally circular top plate 3a and a generally circular bottom plate 3b are spaced from each other by a prescribed interval. Plural rod-shaped wire support members 3c are disposed between the top plate 3a and the bottom plate 3b so as to be arranged at prescribed intervals along a circle, and the two ends of each wire support member 3c are fixed to the top plate 3a and the bottom plate 3b. A hole 3d is formed through the top plate 3a of the filter frame 3 at the center, and the fixing member 2 penetrates through the hole 3d. The top end portion of the fixing member 2 is fixed to the top plate 3a. An outflow hole 3e that is larger in diameter than the fixing member 2 is formed through the bottom plate 3b of the filter frame 3 at the center so as to allow a fluid to flow between the circumference of the outflow hole 3e and the fixing member 2 that is loosely inserted through the outflow hole 3e at the center. In the main body 1, the bottom plate 3b of the filter frame 3 separates the space formed above the bottom plate 3b and outside the outer circumferential surface of an element 5 (described later) from the space formed under the bottom plate 3b of the main body 1 in such a manner that a fluid cannot flow from one space to the other.

Figure 2:
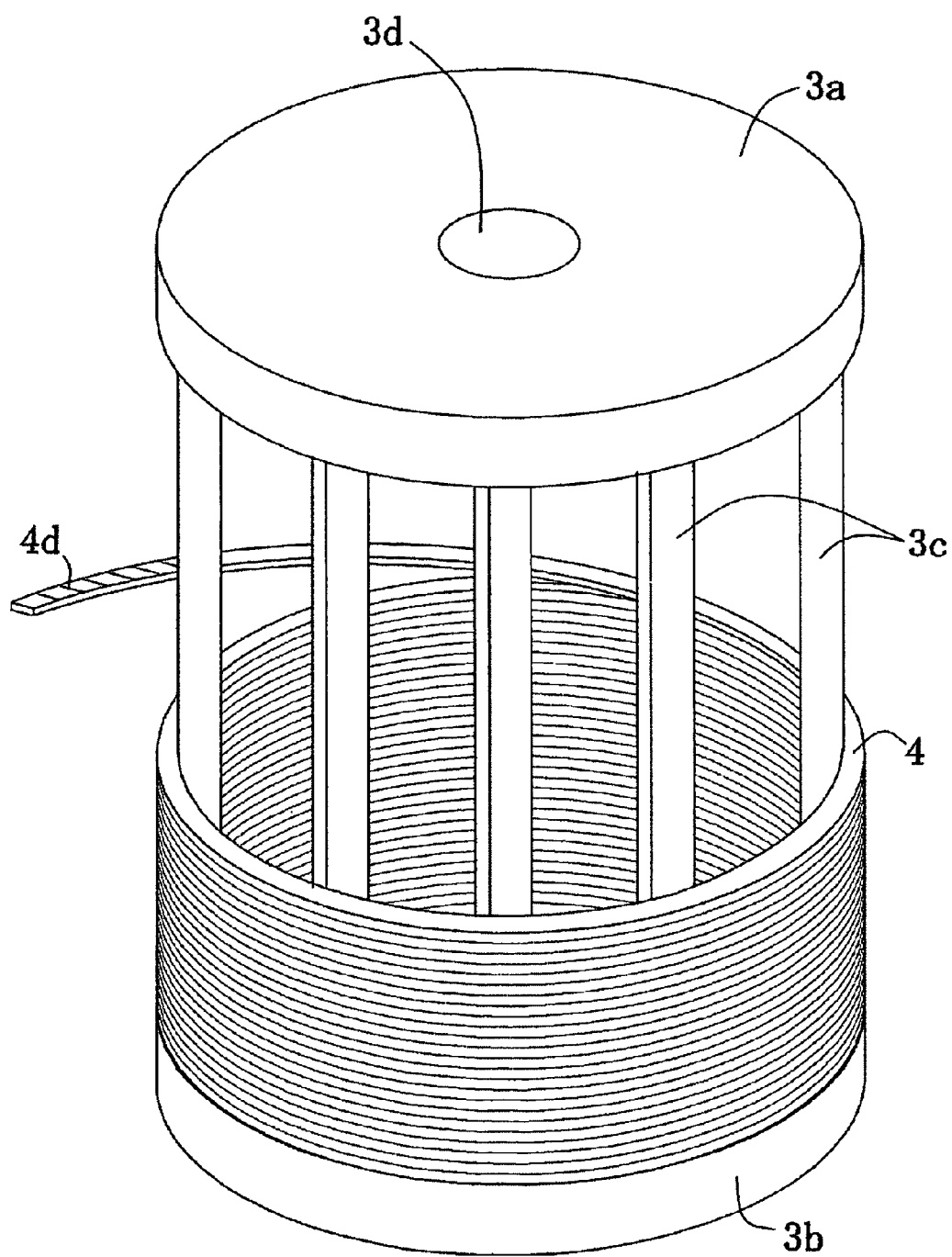
FIG. 2 is a perspective view of an element of the filtration apparatus according to the embodiment.
Figure 3:
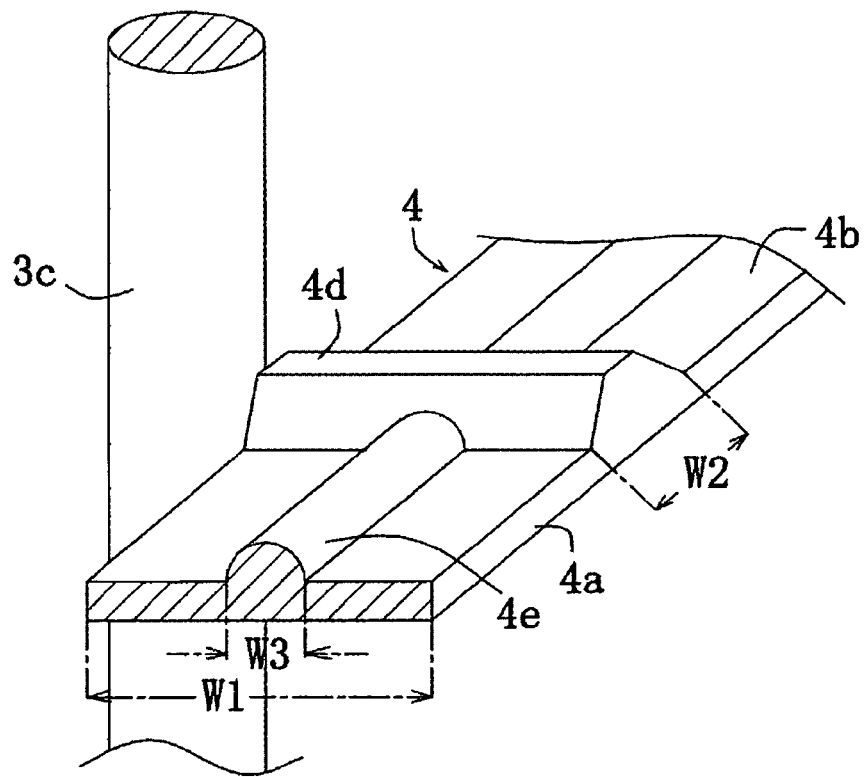
FIGS. 3 and 4 are a perspective view and a horizontal sectional view, respectively, of a wire support member and part of a wire that is in contact with it in the filtration apparatus according to the embodiment.
Figure 4:
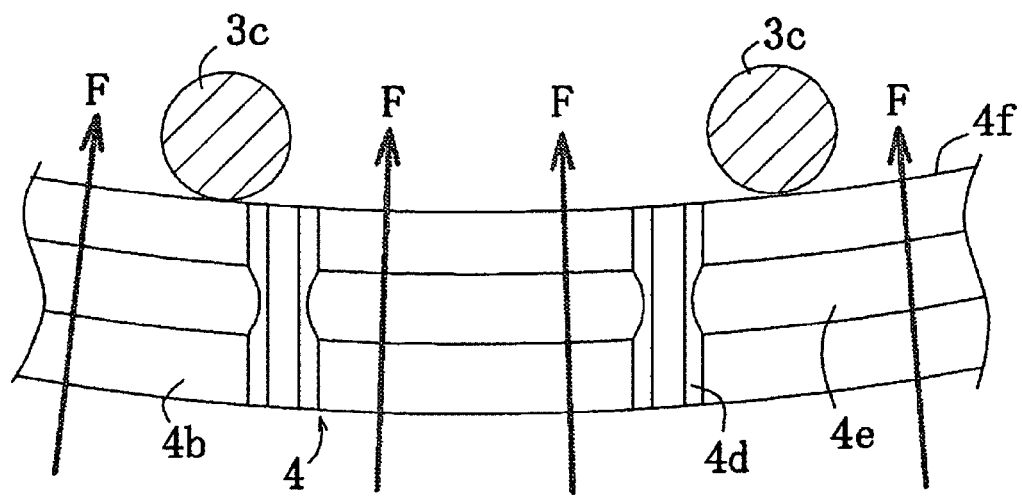
Figure 5:
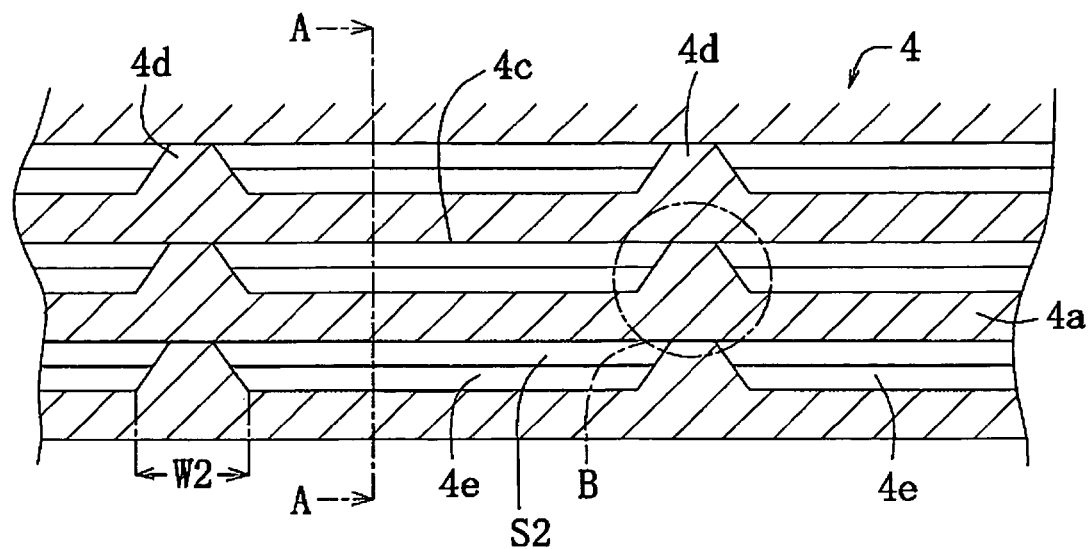
FIG. 5 is a vertical sectional view of part of the wire that is wound in layers in the filtration apparatus according to the embodiment.
Figure 6:
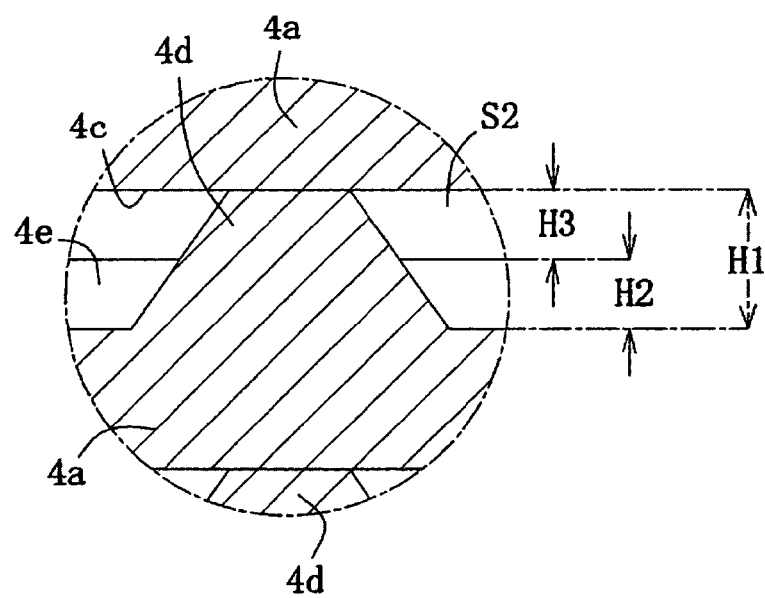
FIG. 6 is an enlarged view of part B in FIG. 5.

As shown in FIG. 2, a notch wire 4 is positioned so as to circumscribe the circularly arranged wire support members 3c of the filter frame 3 and is wound spirally around those. The filter frame 3 and the notched wire 4 that is wound around the filter frame 3 in layers constitute the element 5.

As shown in FIGS. 3-7, the notched wire 4 has a band base 4a having a rectangular cross section, first projection stripes 4d each of which is a projection stripe that is formed on the top surface 4b of the base 4a, extends in the width direction of the base 4a, and has a generally trapezoidal cross section, and second projection stripes 4e each of which is a projection stripe that is formed on the top surface 4b of the base 4a, extends in the longitudinal direction of the base 4a, and has a generally semicircular cross section. The height H2 of the second projection stripes 4e is smaller than the height H1 of the first projection stripes 4d. In this manner, the two kinds of projection stripes (first projection stripes 4d and second projection stripes 4e) are provided that are different from each other in height and extending direction. The plural first projection stripes 4d are formed at prescribed intervals in the longitudinal direction so as to have a bottom width W2 and a length that is equal to the width W1 of the base 4a. Each of the second projection stripes 4e is formed between the adjoining first projection stripes 4d approximately at the center in the width W1 of the base 4a so as to have a bottom width W3 that is smaller than the width W1 of the base 4a approximately. The notched wire 4 is formed by working on a stainless steel wire, for example.

The element 5 is configured in the following manner. The notched wire 4 is wound around the outer surfaces of the wire support members 3c (a single spiral is formed) in such a manner that the top ends of the first projection stripes 4d formed on a lower-layer section of the base 4a are in contact with the bottom surface 4c of an upper-layer section of the base 4a and that the inner surface 4f of the base 4a circumscribes the wire support members 3c, whereby the notched wire 4 is positioned. The top surface 4b and the bottom surface 4c of the base 4a are approximately perpendicular to the center axes of the main body 1 and the wire support members 3c. In the element 5, the first projection stripes 4d extend in radial directions of the main body 1 and are arranged at prescribed intervals (e.g., at regular intervals) in the circumferential direction. The second projection stripes 4e extend in the circumferential direction of the main body 1. The winding pitch (i.e., layer interval) of the notched wire 4 in the axial direction of the element 5 is equal to the height H1 of the first projection stripes 4d.

In the element 5, gaps S1 having a height H1 are formed by the top surface 4b of a lower-layer section of the base 4a, the side surfaces of the first projection stripes 4d formed on the top surface 4b, and the bottom surface 4c of an upper-layer section of the base 4a (the two sections have the interval H1). Gaps S2 having a height H3 are formed by the side surfaces of the first projection stripes 4d formed on the top surface 4b of a lower-layer section of the base 4a, the peaks of the second projection stripes 4e that are formed on the top surface 4b and whose height H2 is smaller than the height H1 of the first projection stripes 4d, and the bottom surface 4c of an upper-layer section of the base 4a (the two sections have the interval H1). The element 5 thus configured can remove particles 6a whose diameters are longer than the height H3 (=H1−H2) of the gaps S2 from a fluid to be filtered. As the height H3 of the gaps S2 is reduced, the minimum diameter of capturable particles in a fluid to be filtered is decreased and the filtering performance is enhanced. That is, the height H3 of the gaps S2 is an index of the filtering performance of the element 5 and the notched wire 4.

From the viewpoint of increasing the filtering performance, it is desirable that the height H1 of the first projection stripes 4d, the width of the first projection stripes 4d, and the interval between the first projection stripes 4d that determines the width of the gaps S1 and S2 be set as small as possible. From the viewpoint of realizing a smooth fluid flow by reducing the flow resistance, it is desirable that they be set large. In conclusion, they are set as appropriate in accordance with required filtering performance, flow resistance, and strength. The width of the second projection stripes 4e is set as appropriate in accordance with required flow resistance and strength.

The element 5 is disposed in the main body 1 in such a manner that the top surface 4b and the bottom surface 4c of the base 4a are approximately perpendicular to the center axis of the main body 1 and parallel with flow directions F of a fluid to be filtered, that the first projection stripes 4d are parallel with the flow directions F, and that the second projection stripes 4e cross the flow directions F at about 90°. The fluid is allowed to flow through the gaps S1 and S2 smoothly while being filtered reliably by the gaps S1 and S2.

Figure 7:
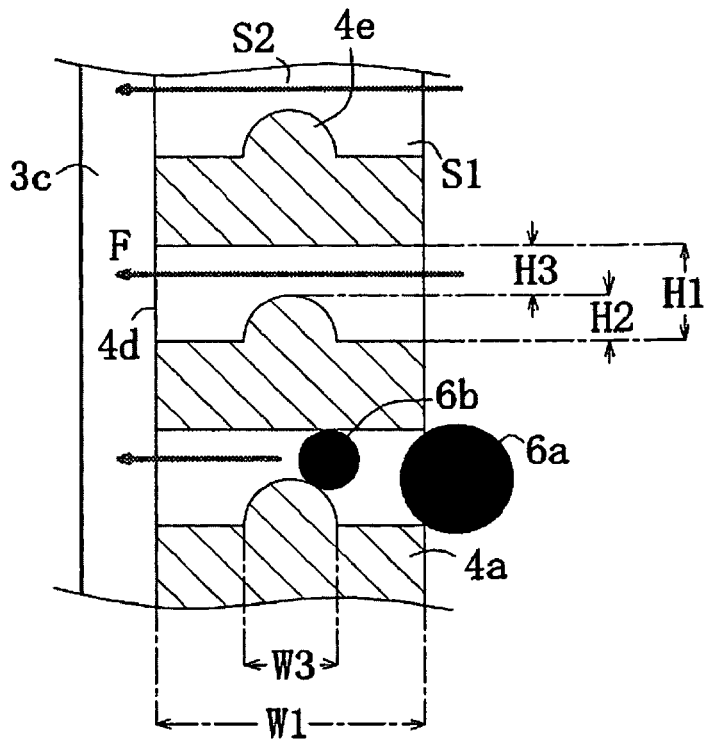
FIG. 7 is a sectional view taken along line A-A in FIG. 5.

When a fluid is filtered by the above filtration apparatus, the fluid to be filtered flows into the main body 1 through the inlet 1a which is located at the top, is sent to the space outside the outer circumferential surface of the element 5, and flows into the element 5 passing through the gaps S1 and S2 of the layered notched wire 4 of the element 5, as indicated by symbol F in FIG. 1. During that course, as shown in FIG. 7, the element 5 performs two stages of filtering, that is, filtering by the gaps S1 having the height H1 that is equal to the height H1 of the first projection stripes 4d and filtering by the gaps S2 having the height H3 (=H1−H2) that is the height H1 of the first projection stripes 4d minus the height H2 of the second projection stripes 4e. That is, the element 5 removes particles 6a whose diameters are longer than the height H1 by the input openings of the gaps S1 and removes, just before the gaps S2, particles 6b whose diameters are longer than the height H3 among the particles that have entered the gaps S1, whereby the fluid from which foreign substances whose diameters are longer than the height H3 have been removed flows into the element 5. The filtered fluid flows out of the element 5 through the outflow hole 3e of the bottom plate 3b of the element 5, goes into the space that is located under the bottom plate 3b of the main body 1, and flows out of the main body 1 through the outlet 1b.

The filtration apparatus according to the embodiment performs the two stages of filtering; that is, particles 6a whose diameters are longer than H1 are removed by the gaps S1 having the height H1 and particles 6b whose diameters are longer than H3 are removed by the gaps S2 having the height H3 from a fluid from which the particles 6a whose diameters are longer than H1 have been removed. This enables efficient and reliable filtering. Further, the second projection stripes 4e which are formed on the base 4a have a reinforcement function and hence can give high strength to the notched wire 4. Furthermore, since the width (e.g., bottom width W3) of the second projection stripes 4e are shorter than the length of the first projection stripes 4d and the width W1 of the base 4a, the wall resistance that occurs when a fluid flows through the gaps S2 is made lower and hence the flow resistance is made much lower than in a case that gaps having the same height and size as the gaps S2 are formed by only the first projection stripes 4d: a very smooth fluid flow can be secured. Still further, since the second projection stripes 4e have a generally semicircular cross section, turbulence is prevented from occurring in a fluid flow, which contributes to the reduction of the flow resistance. This also contributes to securing a very smooth fluid flow.

Although in the above embodiment the first projection stripes 4d are projection stripes having a generally trapezoidal cross section, the first projection stripes 4d may have other proper shapes. For example, the first projection stripes 4d may be projection stripes having a generally semicircular cross section or a generally rectangular cross section. Instead of being formed in the width direction of the base 4a, the first projection stripes 4d may be formed so as to have a prescribed inclination angle with respect to the width direction of the base 4a. Further, instead of being equal to the width W1 of the base 4a, the length of the first projection stripes 4d may be made shorter than the width W1 of the base 4a.

Figure 8:
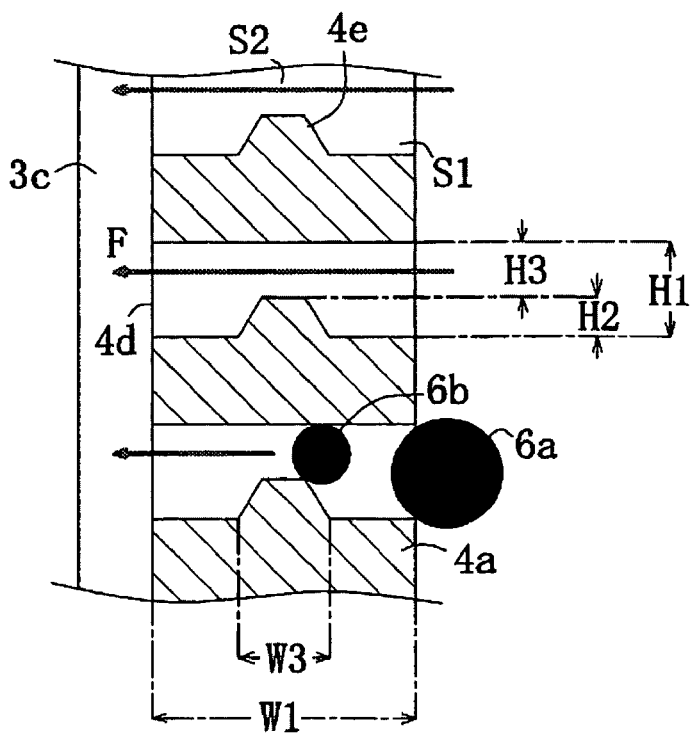
FIG. 8 is a sectional view, corresponding to the A-A sectional view of FIG. 5, of a wire according to a first modification.

Although in the above embodiment each of the second projection stripes 4e is formed approximately at the center of the width W1 of the base 4a, it may be formed at an appropriate position in the width direction of the base 4a. Although in the above embodiment the second projection stripes 4e are projection stripes having a generally semicircular cross section, the second projection stripes 4e may have other proper shapes. It is preferable that the second projection stripes 4e be shaped so as to reduce the flow resistance of a fluid to be filtered that crosses the second projection stripes 4e. For example, the second projection stripes 4e may be projection stripes having a generally trapezoidal cross section (see FIG. 8) or a generally triangular cross section instead of a generally semicircular cross section, in which case the flow resistance of a fluid to be filtered can be reduced and the manufacture of the notched wire 4 can be facilitated, which are preferable results. Further, although in the above embodiment the second projection stripes 4e are formed so as to cross the flow directions F of a fluid to be filtered at about 90°, they may be formed so as to cross the flow directions F at a prescribed angle other than 90°.

Figure 9:
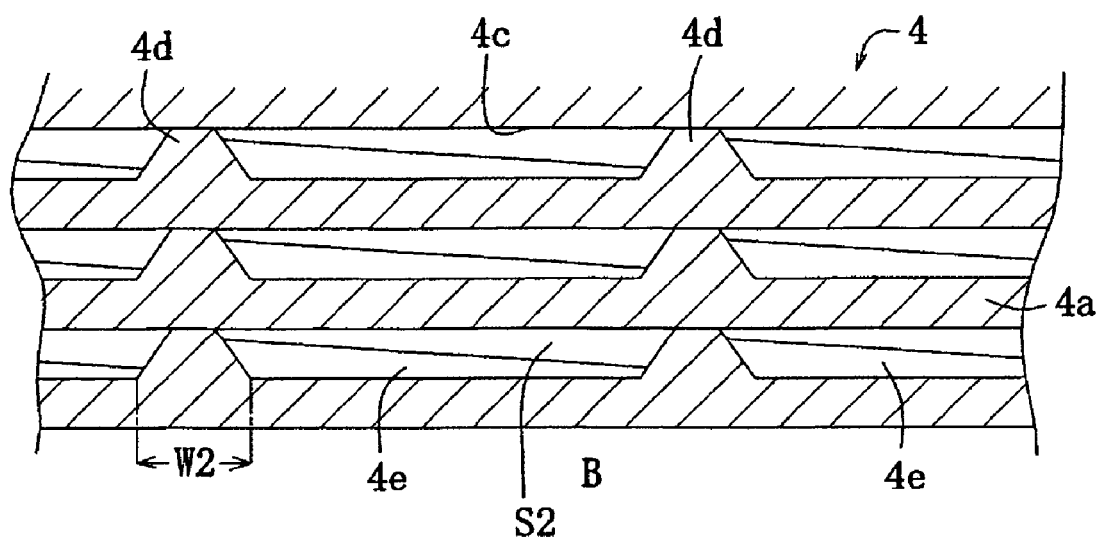
FIG. 9 is a vertical sectional view of part of a layered wire according to a second modification.

Although in the above embodiment the height H2 of each of the second projection stripes 4e is set constant in the longitudinal direction of the base 4a between the first projection stripes 4d, the height H2 of each of the second projection stripes 4e may vary gradually in the longitudinal direction of the base 4a between the first projection stripes 4d. For example, as shown in FIG. 9, the height H2 of each of the second projection stripes 4e may increase gradually at a constant rate in the longitudinal direction of the base 4a between the first projection stripes 4d.

For example, the invention can be used for filtering in high-purity water treatment and powder classification.

What is claimed is:

1. A notched wire disposed in layers in a filtration apparatus, comprising:
    first projection stripes formed on one surface of a band plate, at prescribed intervals along a longitudinal direction of the band plate, so as to extend across a layering direction of the band plate in a flow direction that is substantially perpendicular to the longitudinal direction and to the layering direction of the band plate or has a prescribed inclination angle with respect to the longitudinal direction of the band plate; and
    second projection stripes extending between the first projection stripes on the one surface of the band plate, a height of the second projection stripes being smaller than that of the first projection stripes and a width of the second projection stripes being less than a width of the first projection stripes in the flow direction of the band plate;
    wherein each of the second projection stripes is formed within a center band that is narrower than a width of the band plate in the flow direction.

2. The notched wire according to claim 1, wherein each of the second projection stripes has a convex surface.

3. The notched wire according to claim 2, wherein the second projection stripes are projection stripes having a substantially semicircular cross section.

4. The notched wire according to claim 1, wherein the height of each of the second projection stripes extending between the first projection stripes varies gradually in the longitudinal direction thereof.

5. The notched wire according to claim 1, wherein each of the second projection stripes is formed substantially at a center of a width of the band plate.

6. The notched wire according to claim 1, further comprising:
    a filter frame of a filtration apparatus; wherein
    the notched wire is wound around the filter frame spirally in layers.

7. The notched wire according to claim 6, further comprising:
    a main body; wherein
    the notched wire element is disposed in the main body comprising the filter frame and the notched wire that is wound around the filter frame spirally in layers.

8. The notched wire according to claim 7, wherein as a fluid or a powder flows through the notched filter element, it is filtered in two stages by first gaps S1 having the same height as the height of the first projection stripes and second gaps S2 having a height that is the height of the first projection stripes minus the height of the second projection stripes, the first and second gaps being formed between layered sections of the notched wire.

9. The notched wire according to claim 2, wherein the height of each of the second projection stripes extending between the first projection stripes varies gradually in the longitudinal direction thereof.

10. The notched wire according to claim 3, wherein the height of each of the second projection stripes extending between the first projection stripes varies gradually in the longitudinal direction thereof.

11. The notched wire according to claim 1, wherein the band plate has a substantially rectangular cross section including two straight parallel sides.

12. The notched wire according to claim 11, wherein the second projection stripes are projection stripes having a substantially semicircular cross section.

13. The notched wire according to claim 12, wherein each of the second projection stripes is formed substantially at a center of a width of the band plate.

14. The notched wire according to claim 1, wherein the flow direction is perpendicular to the longitudinal direction.

15. The notched wire according to claim 3, wherein the second projection stripes are projection stripes having a semicircular cross section.

16. The notched wire according to claim 5, wherein each of the second projection stripes is formed at the center of the width of the band plate.

17. The notched wire according to claim 11, wherein the band plate has a rectangular cross section including two straight parallel sides.

18. The notched wire according to claim 12, wherein the second projection stripes are projection stripes having a semicircular cross section.

19. The notched wire according to claim 13, wherein each of the second projection stripes is formed at the center of the width of the band plate.

* * * * *